United States Patent
Tillmanns et al.

(10) Patent No.: US 12,435,422 B2
(45) Date of Patent: Oct. 7, 2025

(54) METHOD FOR RECORDING A STATE OF A CVD REACTOR UNDER PRODUCTION CONDITIONS

(71) Applicant: AIXTRON SE, Herzogenrath (DE)

(72) Inventors: Pascal Tillmanns, Monschau (DE); Oliver Schön, Herzogenrath (DE); Thomas Schmitt, Mönchengladbach (DE); Peter Sebald Lauffer, Aachen (DE)

(73) Assignee: AIXTRON SE, Herzogenrath (DE)

( * ) Notice: Subject to any disclaimer, the term of this patent is extended or adjusted under 35 U.S.C. 154(b) by 854 days.

(21) Appl. No.: 17/593,423

(22) PCT Filed: Mar. 20, 2020

(86) PCT No.: PCT/EP2020/057797
§ 371 (c)(1),
(2) Date: Sep. 17, 2021

(87) PCT Pub. No.: WO2020/188087
PCT Pub. Date: Sep. 24, 2020

(65) Prior Publication Data
US 2022/0186375 A1    Jun. 16, 2022

(30) Foreign Application Priority Data
Mar. 21, 2019 (DE) ............ 10 2019 107 295.6

(51) Int. Cl.
*C23C 16/52* (2006.01)
*C23C 16/02* (2006.01)
(Continued)

(52) U.S. Cl.
CPC .......... *C23C 16/52* (2013.01); *C23C 16/0236* (2013.01); *C23C 16/4586* (2013.01); *C23C 16/466* (2013.01); *C23C 16/54* (2013.01)

(58) Field of Classification Search
CPC ............ C23C 16/0236; C23C 16/4586; C23C 16/466; C23C 16/52; C23C 16/54
See application file for complete search history.

(56) References Cited

U.S. PATENT DOCUMENTS 6,433,314 B1 * 8/2002 Mandrekar ............ G05D 23/19
                                                                       219/390
6,455,437 B1   9/2002 Davidow et al.
(Continued)

FOREIGN PATENT DOCUMENTS

DE    102013114412 A1    6/2015
DE    102014117388 A1    6/2016
(Continued)

OTHER PUBLICATIONS

Written Opinion mailed Oct. 6, 2020, from the ISA/EP, for International Patent Application No. PCT/EP2020/057797 (filed Mar. 20, 2020), English translation, 10 pgs.
(Continued)

*Primary Examiner* — Nathan H Empie
(74) *Attorney, Agent, or Firm* — Ascenda Law Group, PC

(57) ABSTRACT

During a process involving one or more process steps of a process phase, in which a substrate is located in the process chamber of a CVD reactor, a process temperature and a pressure are each set and a process gas flow is fed into the process chamber by way of control data delivered by a controller in accordance with a formula stored in the controller. Additionally, sensors are used to determine measurement data from which a current fingerprint is calculated and then compared with a historic fingerprint. The fingerprint includes only values or groups of values that are obtained from measured values that are recorded during one or more conditioning steps of a conditioning phase in which a conditioning temperature and a conditioning pressure are each set and a conditioning gas flow is fed into the process chamber in accordance with control data specified by the formula.

12 Claims, 8 Drawing Sheets

(51) Int. Cl.
*C23C 16/458* (2006.01)
*C23C 16/46* (2006.01)
*C23C 16/54* (2006.01)

(56) References Cited

U.S. PATENT DOCUMENTS

| | | | |
|---|---|---|---|
| 6,964,876 B2* | 11/2005 | Heuken | C23C 16/52 |
| | | | 438/483 |
| 7,212,950 B2 | 5/2007 | Poolla | |
| 7,583,833 B2 | 9/2009 | McIntyre et al. | |
| 2003/0183160 A1* | 10/2003 | Fujikura | C30B 25/02 |
| | | | 117/86 |
| 2004/0254762 A1 | 12/2004 | Hopkins et al. | |
| 2004/0266181 A1* | 12/2004 | Schauer | C23C 16/4581 |
| | | | 438/680 |
| 2007/0195853 A1 | 8/2007 | Park et al. | |
| 2008/0015814 A1* | 1/2008 | Harvey | G05B 23/024 |
| | | | 702/179 |
| 2015/0017789 A1* | 1/2015 | Hashimoto | H01L 21/02389 |
| | | | 438/503 |
| 2016/0253441 A1* | 9/2016 | Yanguas-Gil | G06F 30/20 |
| | | | 703/2 |

FOREIGN PATENT DOCUMENTS

| | | | |
|---|---|---|---|
| DE | 102017105333 A1 * | 9/2018 | ............ C23C 14/541 |
| JP | H07221029 A | 8/1995 | |
| JP | 2016213400 A | 12/2016 | |
| WO | 02092876 A1 | 11/2002 | |
| WO | 03033763 A1 | 4/2003 | |
| WO | 2019121313 A1 | 6/2019 | |

OTHER PUBLICATIONS

International Preliminary Report on Patentability issued Sep. 16, 2021, from The International Bureau of WIPO, for International Patent Application No. PCT/EP2020/057797 (filed Mar. 20, 2020), 23 pgs.
International Search Report mailed Oct. 6, 2020, from the ISA/EP, for International Patent Application No. PCT/EP2020/057797 (filed Mar. 20, 2020), 10 pgs.
Written Opinion mailed Oct. 6, 2020, from the ISA/EP, for International Patent Application No. PCT/EP2020/057797 (filed Mar. 20, 2020), 11 pgs.
Moyne; et al. "Big Data Analytics for Smart Manufacturing: Case Studies in Semiconductor Manufacturing" processes (Jul. 12, 2017), 5(39):1-20.

* cited by examiner

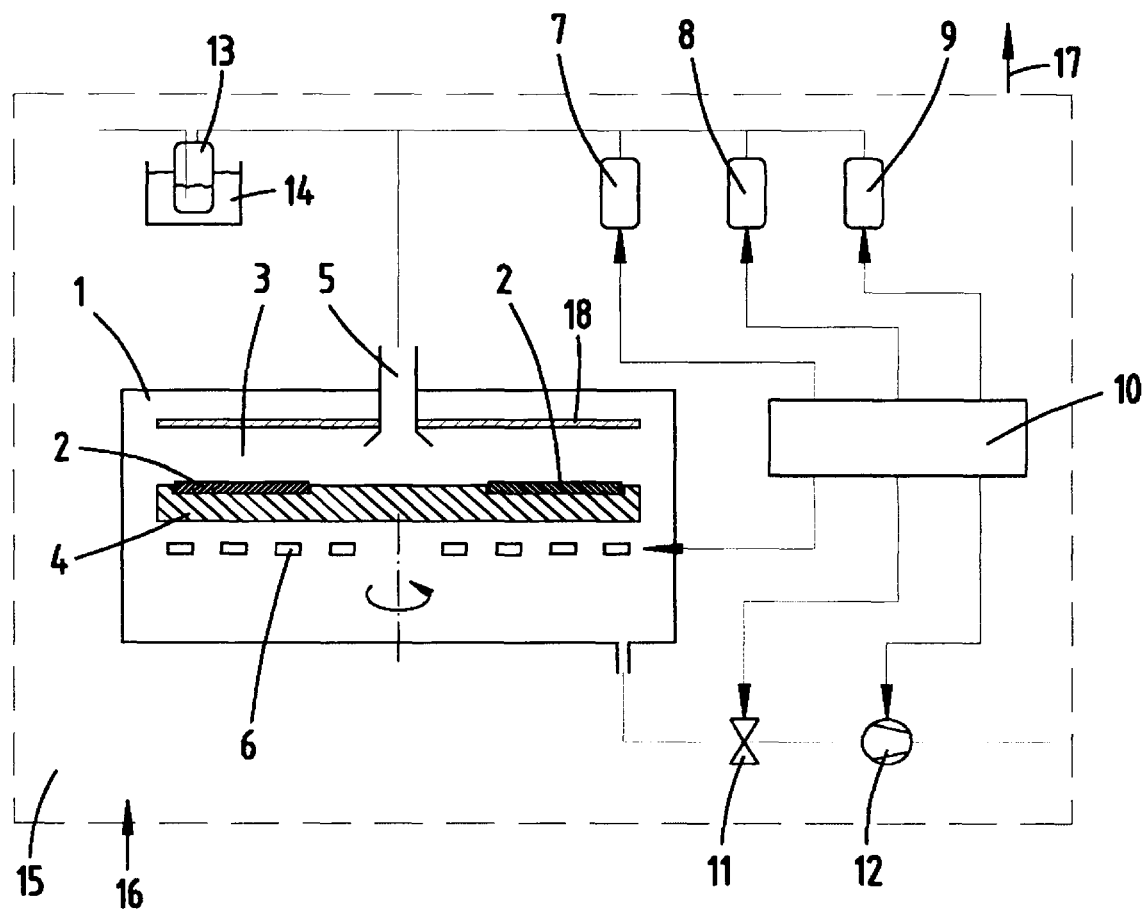

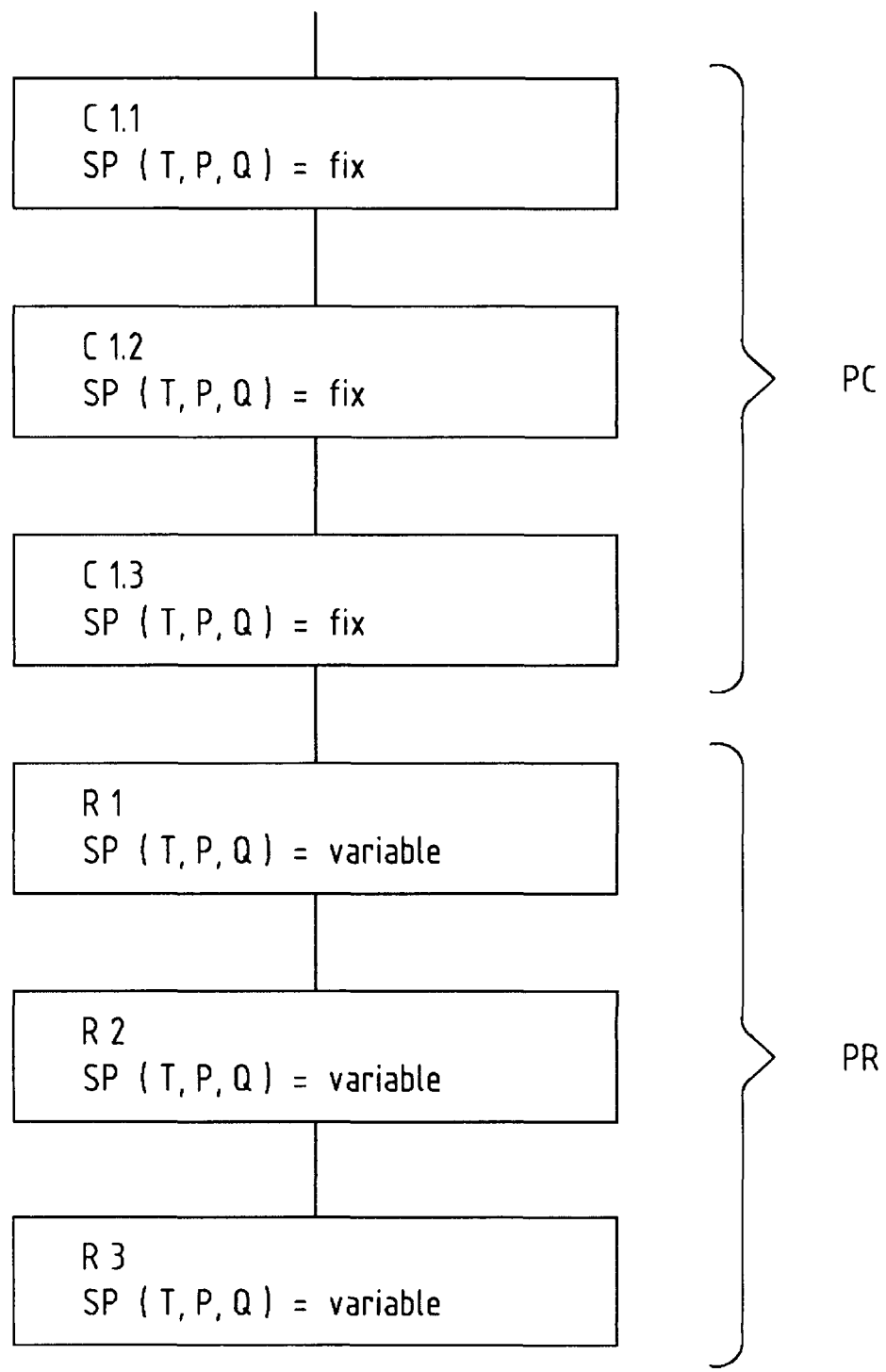

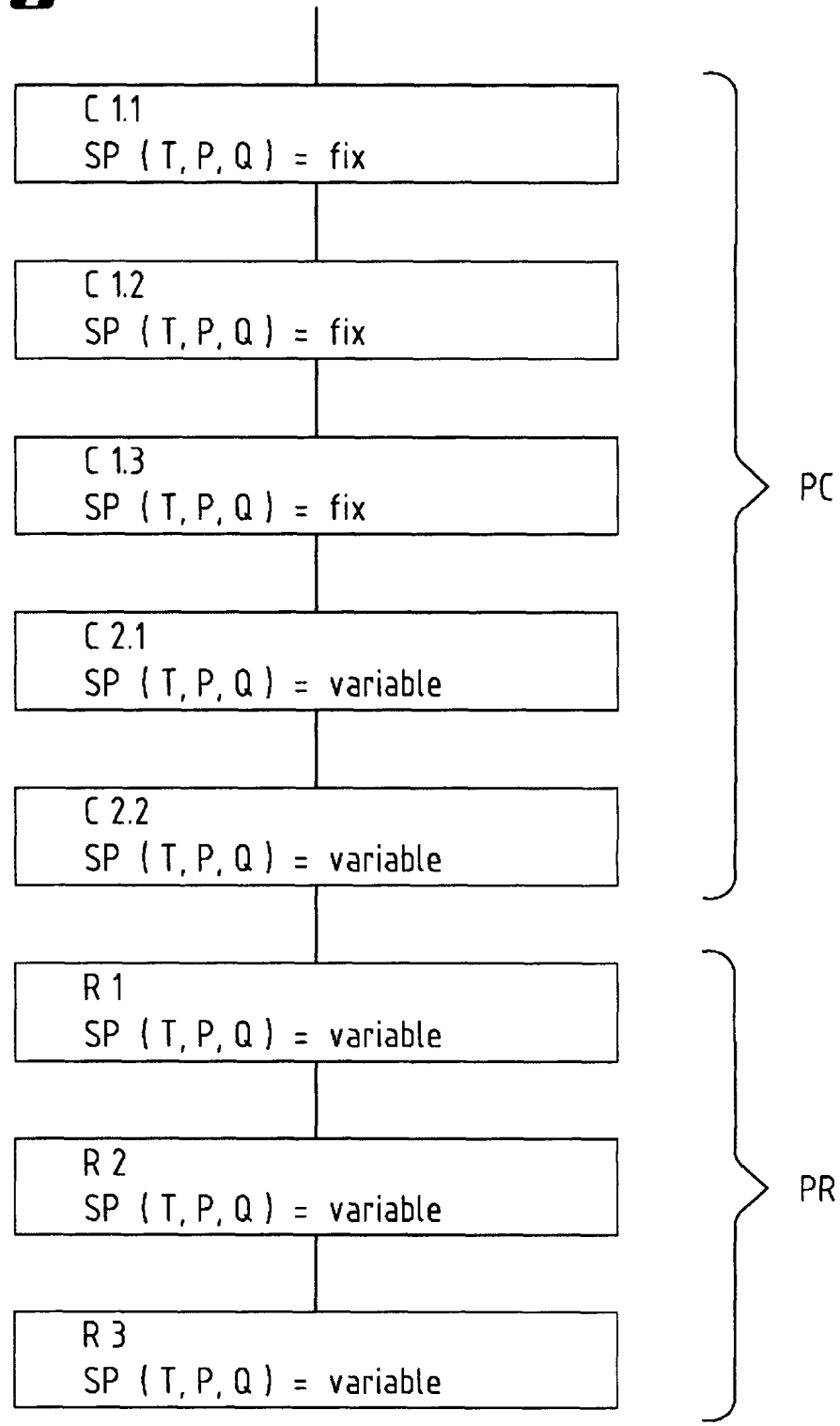

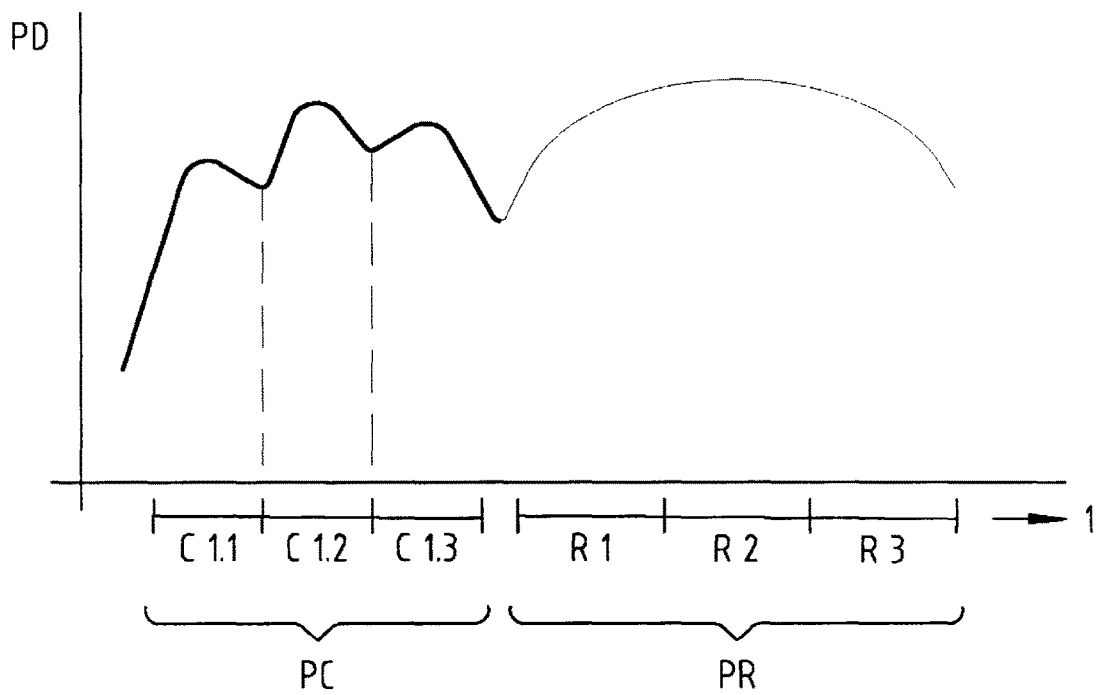
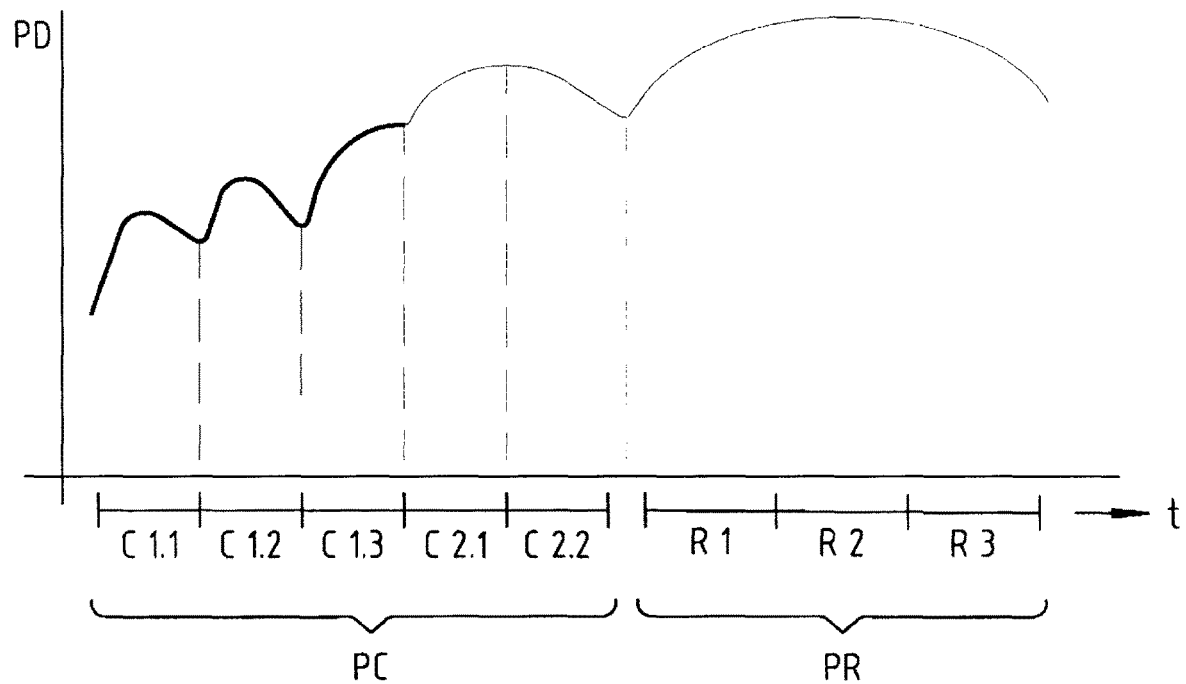

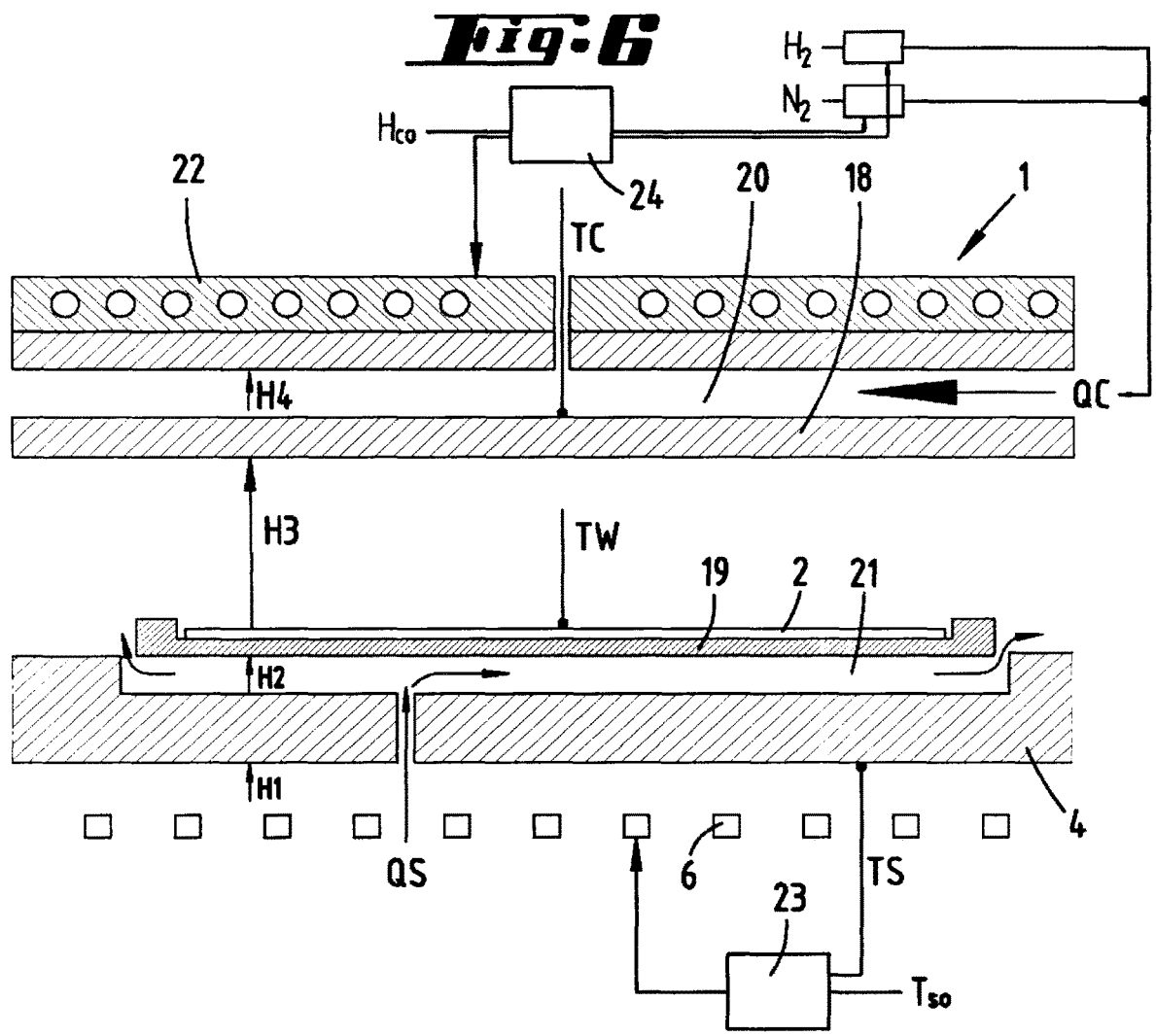

METHOD FOR RECORDING A STATE OF A CVD REACTOR UNDER PRODUCTION CONDITIONS

RELATED APPLICATIONS

This application is a National Stage under 35 USC 371 of and claims priority to International Application No. PCT/EP2020/057797, filed 20 Mar. 2020, which claims the priority benefit of DE Application No. 10 2019 107 295.6, filed 21 Mar. 2019.

FIELD OF THE INVENTION

The invention relates to a method for the operation of a CVD-reactor having a process chamber, in which, during a process in one or a plurality of process steps of a process phase, in which a substrate is located in the process chamber, a process temperature, a pressure and a process gas flow into the process chamber are each set by means of control data, supplied by a controller in accordance with a formula stored in the controller, wherein measured data are determined during the process by means of sensors, from which measured data a current fingerprint is calculated, which is compared with a historical fingerprint determined in the same manner in one or a plurality of older processes.

BACKGROUND

A CVD-reactor is part of a coating plant, which, in the production process of coated semiconductor substrates, carries out treatment phases of the substrate according to formulae prescribed by the operator of the plant, in which substrates are applied automatically, semi-automatically, or manually, onto a susceptor arranged within the CVD-reactor. The process chamber, in which the susceptor is located, is pumped out, purged, and brought to a process temperature at which process gases are fed into the process chamber, so that a layer is deposited on the substrate surface. The treatment phase of the process can comprise a multiplicity of process steps that are carried out with different process parameters, that is to say, at different temperatures, total pressures, or process gas compositions.

The CVD-reactor is conditioned before or after each treatment phase in question. It is also envisaged that the CVD-reactor is calibrated before a treatment phase. The method can thus have a calibration or a conditioning phase that precedes a process phase. In the calibration phase, process parameters, in particular heat input parameters and heat dissipation parameters, are varied. These are parameters that influence the flow of heat into the substrate and the heat dissipation from the substrate, respectively. When these parameters are varied, the substrate temperature is altered. Thus in a calibration step, the values for various parameters can be determined, with which a prescribed substrate temperature can be achieved.

In a conditioning phase, the process chamber is to be brought into a defined setpoint state. The conditioning phase usually also consists of a multiplicity of steps, namely a multiplicity of conditioning steps. During a conditioning step, the process chamber is brought up to a conditioning temperature. A conditioning gas is introduced into the process chamber. The conditioning gas can take the form of an etching gas, for example chlorine, or a compound containing a halogen. However, the conditioning gas can also be another gas. The conditioning gas can be used to clean the process chamber. The conditioning gas can also be accompanied by a pre-coating or a conditioning of surfaces of the process chamber. At least one conditioning step is carried out according to fixedly prescribed process parameters.

U.S. Pat. No. 6,455,437 B1 and US 2004/0254762 A1 describe methods for the operation of a CVD-reactor, in which fingerprints are formed from measured values determined during the process. An individual fingerprint is associated with each process step. Historical fingerprints formed in this manner can be compared with current fingerprints, in order to gain early knowledge about the operating state of the CVD-reactor.

U.S. Pat. No. 7,212,950 B2 describes a method for the operation of a CVD-reactor, in which a plurality of CVD-reactors of the same design are used in a factory. In order to detect whether process data in the individual reactors are subject to drift, characteristic fingerprints are formed from measured data, which fingerprints can be compared with each other.

JP 2016213400 A describes a method for the operation of a CVD-reactor, in which process data are obtained during the process steps, and stored in a data collection.

U.S. Pat. No. 7,583,833 B2 describes a system and a method for the quality assurance of a CVD deposition process, in which measured values are determined during operation, which are compared with historical measured values. A method for determining the parameters, in which a multiplicity of values are determined in a calibration process preceding the treatment process in time, is of known art from US 2007/0195853 A1. From the multiplicity of values, the parameters are determined that deliver an actual temperature that most closely approximates to a prescribed temperature. There, temperatures are increased in a stepwise manner using a setup formula. At each step, temperature values are measured on a plurality of sensors. The values thereby obtained form a matrix, with which a calibrated thermal model is calculated from a standard model that takes the thermal characteristics into account. The calibrated thermal model reproduces the actual temperatures achieved.

The prior art described above enables processes with a sequence of identical process steps to be compared with each other with respect to the stability of the process. If the control data are varied by the user, updated fingerprints must be obtained in order to analyze the stability of the processes later carried out with the same control data.

SUMMARY OF THE INVENTION

The invention is based on the object of obtaining reliable knowledge about the thermal characteristics of the plant state of a CVD-reactor, even if the user varies the control data in the process phase.

The object is achieved by the invention specified in the claims, wherein the subsidiary claims represent not only advantageous developments of the independent claims, but also autonomous achievements of the object.

In accordance with a first aspect of the invention, measures are proposed, with which a meaningful statistical analysis of a plant state is possible, in particular even if process steps that differ from one another are carried out during the process phase.

First and foremost, it is proposed that at least one conditioning step is carried out with fixedly prescribed, invariable, process parameters. Each of the multiplicity of processes carried out in the production of coated semiconductor substrates has this at least one first conditioning step, which can, as required, be combined with second conditioning steps that have individual process parameters. In accordance with the invention, process data are determined at least during the said first conditioning step, and these process data are statistically evaluated with similar process data. Thus, the process data statistically linked to each other are only those that have been determined in the same first conditioning steps, that is to say, those carried out with the same prescribed process parameters. In particular, the process data are measured data, such as a total pressure within the process chamber, a temperature within the process chamber, or a measured partial pressure of a process gas. The process parameters are setpoint temperatures, setpoint pressures, and setpoint flows of process gases. The process parameters and process data can also be the setpoint values and actual values of temperatures of a temperature control bath, humidity values, etc. The CVD-reactor has a controller. The controller has a memory. A formula can be stored in the memory, in accordance with which the process is carried out. The process can be divided into two phases, a conditioning phase, in which the process chamber is conditioned in the absence of the substrates, or in the presence of a dummy substrate, and a process phase, in which a substrate located in the process chamber is processed, for example, in which a substrate is coated with one or a plurality of layers. Both the process phase and the conditioning phase can in each case have a plurality of steps. The controller provides control data for each process step and for each conditioning step, according to which a conditioning temperature or a process temperature, a conditioning pressure or a process pressure, and a conditioning gas flow or a process gas flow are set. The conditioning gas flow and the process gas flow can thereby have a multiplicity of individual gas flows, for example a carrier gas flow and a plurality of reaction gas flows. During the individual steps, measured values are recorded by means of suitable sensors at various points both inside the process chamber, and also outside the process chamber. The measured values can be partial pressures in a gas phase inside or outside the process chamber. The measured data can, however, also be temperatures at various locations inside or outside the process chamber. Thus the measured data can be exhaust gas temperatures, or temperatures of walls within the process chamber. However, measured values from exhaust air sensors, sensors that measure the temperatures of other units, for example pumps, and also cooling circuits, can also come into consideration. The measured values can be recorded in a control cabinet, in a loading and unloading cabinet for the loading of the CVD-reactor, in a cabinet in which a gas mixing system is located, or in a pump housing. In accordance with a preferred design of the invention, a conditioning phase has a plurality of first conditioning steps, that is to say, conditioning steps that are always carried out with the same process parameters, wherein the said plurality of first conditioning steps preferably directly follow one another. The values that are measured during a conditioning step are stored. To calculate a historical fingerprint, the historical measured values are evaluated statistically. Preferably, only such measured values from a multiplicity of historical processes are used, as were obtained during the same conditioning steps in all processes. The historical fingerprint can thus be the result of a calculation in which measured values of conditioning steps, carried out with identical process parameters, are related. The current fingerprint that is to be compared with the said historical fingerprint was obtained with measured values that were determined in one or a plurality of conditioning steps that have the same process parameters as those used to determine the historical fingerprint. Minimum values, maximum values, mean values, and standard deviations, can be formed. The historical statistical data obtained in this manner are related to the current process data, in order to determine deviations of the CVD-reactor or the CVD plant from a setpoint state. In a process, a production plant having a CVD-reactor runs through the following production cycle, for example, wherein a prescribed algorithm, that is to say, a calculation rule, is used to calculate values, or groups of values, referred to herein as a fingerprint, from the historical measured values and the current measured values. From the statistical calculations, a one-dimensional or multi-dimensional window can be calculated, in which a current fingerprint must lie in order to identify the actual state of the CVD-reactor as being in order. The process is a production cycle that comprises a plurality of, almost fully automated, phases, wherein essential phases are a process phase and a conditioning phase. The process usually begins by preparing the reactor to be loaded with substrates to be coated. Uncoated substrates are brought into the process chamber from outside for this purpose. The process chamber is prepared for the deposition process. The deposition process then follows, which represents a process phase, and in which a plurality of coating processes can be carried out with different process parameters. A coating process can have a plurality of process steps. After the deposition process is complete, the CVD-reactor is prepared for the transfer of the substrates out of the process chamber. After the coated substrates are transported out of the process chamber, the process chamber is prepared for the conditioning steps. A plurality of first and second conditioning steps are then carried out in a conditioning phase, wherein the second conditioning steps differ from the first conditioning steps in that the second conditioning steps are carried out with control parameters that are modified, or that can be modified by the plant operator, and the first conditioning steps have exclusively control parameters that are fixedly prescribed, in particular that cannot be modified by the plant operator, but only by the manufacturer of the plant. In a first variant, the first conditioning steps are preferably part of each process, wherein individual members of the plurality of processes, which have identical first conditioning steps, can have different process steps, or second conditioning steps, from one another. While in this first variant the conditioning steps can include cleaning steps, in which, for example, chlorine or ammonia is fed into the process chamber, so that parasitic deposits on the walls of the process chamber are removed at elevated temperatures, the first conditioning steps of a second variant can be tempering steps. This variant is essentially only carried out after maintenance of the process chamber, during which the process chamber has been opened so that air has entered into the interior of the process chamber. By baking out of the process chamber at high temperatures, for example at temperatures between 700° C. and 1200° C., any water adsorbed on the surfaces of walls in the process chamber is removed. In particular, hydrogen is fed into the process chamber. In this type of conditioning, it can be envisaged that the regulated process chamber temperature is increased in a plurality of steps from about 700° C. to about 1200° C. Here it can be envisaged that during each of these steps the heat flow from a heating device for the heating of the susceptor, to a cooling device, arranged above a process chamber ceiling, is varied. For this purpose, for example, the thermal resistance of the process chamber ceiling can be varied by feeding a temperature control gas with varying thermal conductivities into a gap. The gap is located, for example, between a lower ceiling plate of the process chamber ceiling and an upper ceiling plate of the process chamber ceiling, which preferably abuts against a temperature control body. In this type of conditioning, a multiplicity of measured values are recorded, in particular the process chamber ceiling temperature, and a substrate temperature measured on a dummy wafer arranged on a substrate holder. The measurements can be carried out with pyrometers. From the measurements, in each case carried out simultaneously, a value can be obtained, which can be compared with historical values. This value can take the form of a single measured value. However, it can also take the form of one or a plurality of values determined statistically from a multiplicity of measured values. The above-described processes are fully automated as far as possible. The manual intervention of the plant operator essentially consists of the provision of cassettes with uncoated substrates, or the removal of the cassettes with coated substrates. The plant operator also defines the treatment formula, which is accompanied by the installation of a control program that supplies actuators, for example mass flow controllers, heating devices or the like, with setpoint values based on the process parameters. A conditioning phase has, for example, the following conditioning steps:

a) Heating of the process chamber under a hydrogen atmosphere,
b) Switch to an inert gas atmosphere (nitrogen),
c) Introduction of an etching gas (Ch) to clean the process chamber and cavities adjacent to the process chamber, such as a gas inlet unit and a gas outlet unit,
d) Purging of the process chamber and cavities adjacent to the latter with an inert gas,
e) Increase of the process chamber temperature and introduction of a conditioning gas, for example $NH_3$, to heat the process chamber and cavities adjacent to the latter,
f) Purging of the process chamber with an inert gas and, as required, $NH_3$,
g) Introduction of an etching gas, for example, chlorine, to clean the process chamber and cavities adjacent to the latter (this step can be repeated multiple times as required),
h) Purging of the process chamber and cavities adjacent to the latter with an inert gas,
i) Increase of the process chamber temperature, introduction of another conditioning gas, or $NH_3$ once again, and a switch to a hydrogen atmosphere to bake out all parts of the CVD-reactor that come into contact with the process gas or the conditioning gas,
j) Cooling of the reactor under a hydrogen/ammonia atmosphere,
k) Purging of the interior of the reactor with an inert gas.

Free parameters are available to the plant operator essentially with regard to the cleaning steps g), j), k).

During the entire conditioning phases, data are recorded that must not be modified during the individual conditioning steps, for example cooling bath temperatures or control cabinet exhaust air properties. These values can be used to evaluate the stability and plausibility of measured values, in particular other values. Temperature sensors are used to record heat flows, amongst other items. For this purpose, data from temperature sensors, and in particular pyrometers, are used. With the temperature sensors, an evaluation of the state of a heating device, or other reactor components that can be temperature-controlled, can be carried out. In particular, data from the region of a vacuum system are also recorded, which system in particular includes throttle valves and pumps.

A second aspect of the invention relates to a method for determining parameters for the temperature control of the surface of a substrate, supported by a susceptor of a CVD-reactor, to a prescribed substrate temperature in order to treat the substrate thermally at that temperature in at least one process step of a process phase, wherein a first parameter is a heat input parameter, which influences a first heat flux supplied from a heat source to the susceptor, and a second parameter is a heat dissipation parameter, which influences a second heat flux dissipated from the surface of the substrate to a heat sink.

In a generic CVD-reactor, the substrate is located in a heat transfer path between a heat source, which is typically a heating device for heating the susceptor, and a heat sink, which is typically a process chamber ceiling, or a cooling device adjacent to the process chamber ceiling. The temperature of the surface of a substrate supported by the susceptor depends on the heat input parameters. The thermodynamic relationships are described in particular in DE 10 2017 105 333 A1, in which the heat transfer paths between the heat source and the substrate, and between the substrate and the heat sink, are considered as heat flow resistances. These heat flow resistances can be modified due to changes in properties, in particular surface properties within the process chamber, during the life of the process chamber. In particular, the heat flow resistances depend on the nature of the process steps previously carried out in the process chamber. In particular, they are influenced by parasitic occupancies of the surfaces of the susceptor and the process chamber ceiling. A heat input parameter can be, for example, the susceptor temperature measured in particular on a lower face of the susceptor, that is to say, the face facing towards the heating device, to which temperature the lower face of the susceptor is regulated. However, the heat input parameter can also be the power supplied to the heating device. A heat dissipation parameter can be the temperature of a process chamber ceiling, which can also be regulated to a setpoint temperature. This can be done by modifying the cooling performance of a cooling device. However, it is also possible to influence the process chamber ceiling temperature by varying a mixing ratio of a temperature control gas, which is fed into a gap between the process chamber ceiling and the cooling device. The temperature control gas consists of two gases with different thermal conductivities.

It is the object of the invention to specify means for the reliable determination of values for a heat input parameter and a heat dissipation parameter, at which a prescribed substrate temperature is established on the surface of the substrate facing towards the process chamber.

The object is achieved by determining a multiplicity of value tuples in one or a plurality of calibration steps. Each of the said value tuples has a value of a first parameter and a value of a second parameter, wherein these parameters can be the regulated susceptor temperature, and/or the regulated process chamber ceiling temperature. However, the parameters can also be the heating power, and/or the mixing ratio of the temperature control gas or the heat dissipation capacity of the cooling device. A function representing the actual temperature of the surface of the substrate by way of at least one of the parameters is formed from the multiplicity of value tuples by means of an at least one-dimensional interpolation. The function can be an individual function of a set of functions. From this function, which can also be a two-dimensional function, at least one parameter is obtained, which correlates with an actual temperature of the substrate surface, which comes closest to the substrate temperature prescribed from a formula. For this purpose, an inverse function is formed, as it were, from the in particular one-dimensional function. The previously described method can be used to determine the value tuples. In this method, a first parameter, for example the susceptor temperature, is modified, in particular increased, in a stepwise manner. During each step, the second parameter, for example the process chamber ceiling temperature, is also varied, that is to say, increased in a stepwise manner. This can be done in the manner previously described by feeding a temperature control gas with a different composition into a gap between the process chamber ceiling and the cooling device. The multiplicity of measured values obtained in this way can be grid points of a two-dimensional mathematical function that can be represented as a surface. The function can be represented in a three-dimensional coordinate system in such a way that, for example, an X-axis represents the susceptor temperature, a Y-axis represents the process chamber ceiling temperature, and the Z-axis represents the measured surface temperature on the substrate. The susceptor temperature and the process chamber ceiling temperature can be regulated temperatures. The measured actual temperature of the substrate surface can be measured with a pyrometer. A function constructed in this manner as a grid can be interpolated as a hilly surface. From the resulting surface, the point in the X-Y surface can be determined that provides a function value that most closely approximates the prescribed substrate temperature. However, in an alternative evaluation of the measured values obtained, a plurality of one-dimensional functions can be used, wherein each calibration step carried out at the same susceptor temperature provides an interpolated measurement curve representing the measured substrate surface temperature against the process chamber ceiling temperature. From this measurement curve, forming, as it were, an inverse function, the parameter, that is to say, the process chamber ceiling temperature, can be determined that correlates with a substrate surface temperature that is closest to a prescribed substrate temperature at the susceptor temperature in question. In the process phase following the calibration phase, the calibration curves obtained in the calibration phase are used, instead of standard calibration curves, in order to modify the parameters, such as susceptor temperature and process chamber ceiling temperature, prescribed by a formula. In a prescribed formula, parameters such as susceptor temperature or process chamber ceiling temperature can be prescribed, according to which the desired substrate temperature is obtained according to a standard characteristic curve. In the calibration phase, a modified characteristic curve is obtained, on the basis of which modified setting values are obtained.

The device in accordance with the invention has a controller, which is programmable. By way of the programming, process parameters of the conditioning phase and the process phase can be prescribed. In accordance with an advantageous design of the invention, the process, and in particular each process carried out with the device, includes one or a plurality of calibration or conditioning steps, which are carried out with fixed prescribed process parameters. These calibration or conditioning steps cannot be omitted by the user. Also, the process parameters of these calibration or conditioning steps cannot be modified. In accordance with an advantageous design of the invention, only the measured values obtained in these invariable steps with the invariable process parameters are used to form the fingerprint. The fingerprint is thus determined in steps of the process prescribed in an invariable manner, with fixedly prescribed process parameters, such as, in particular, a total pressure in the process chamber, a gas flow through the process chamber, and at least one or a plurality of fixed temperatures in the process chamber. This has the advantage that an operating state of the device can be objectively determined, even if different production processes are carried out with the device.

BRIEF DESCRIPTION OF THE DRAWINGS

In what follows, the invention is explained in more detail by means of example embodiments. Here:

FIG. 1 shows a schematic of a CVD-reactor,

FIG. 2 shows a first example embodiment of a formula,

FIG. 3 shows a second example embodiment of a formula,

FIG. 4 shows a graphical illustration of a fingerprint relating to the first example embodiment in FIG. 2, FIG. 5 shows an illustration as in FIG. 4 relating to the second example embodiment in FIG. 3, FIG. 6 shows a schematic illustration of a cross-section through a process chamber to illustrate the heat flux H1, H2, H3, H4 from a heating device 6 to a cooling device 22, and temperatures TC, TS and TW measured within the process chamber.

DETAILED DESCRIPTION

Figure 7:
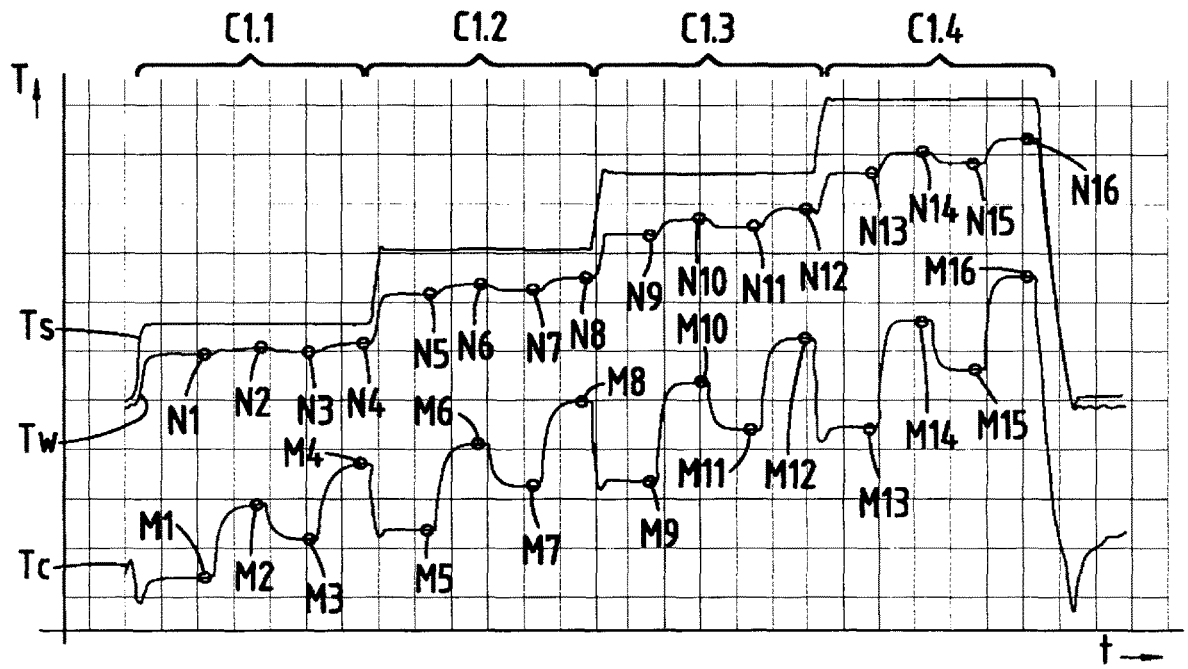
FIG. 7 shows an illustration of a temperature curve T against time t in four successive conditioning steps C1.1, C1.2, C1.3 and C1.4, during which a susceptor temperature TS is increased in a stepwise manner from about 700° C. to 1200° C., and a substrate temperature TW and a ceiling temperature TC are measured.

FIG. 1 shows schematically a CVD-reactor, as it is part of the device in accordance with the invention, and on which the method in accordance with the invention can be practiced.

A process chamber 3 is located in an externally gas-tight housing of the CVD-reactor 1, which in particular is made of stainless steel. The process chamber is located above a susceptor 4 made of graphite, or coated graphite, which can be heated from below by means of an IR-heating device 6. The alternating electromagnetic fields generated by the heating device 6 produce eddy currents in the susceptor 4, which lead to the heating of the susceptor 4. On the upper face of the susceptor 4 lie one or a plurality of substrates 2, which are to be coated during a process carried out within the process chamber 3. Carrier gases or process gases can be fed into the process chamber 3 through a gas inlet 5. A vacuum pump 12 is provided, in front of which is arranged a throttle valve 11. A controller 10 can be used to adjust gas flows of the gas sources, designated 7, 8 and 9, which are fed into the process chamber 3 by means of the gas inlet 5. The controller 10 can also be used to control the heating device 6, the throttle valve 11, and the pump 12.

A fluid source 13, which contains, for example, an organometallic compound, is located in a temperature control bath 14, the temperature of which can be monitored. A process chamber ceiling 18 has a cooling device (not shown), and means for influencing its heat conduction properties. The whole device is located in a cabinet 15, which can essentially be sealed in a gas-tight manner from the environment. The cabinet 15 has incoming air 16 and exhaust air 17. The gas composition in the exhaust air 17 and the exhaust air temperature can be measured.

A cooling flow can pass through the cavities of the spiral-form heating device 6, the temperature of which is monitored by sensors.

Formulae that differ from one another can be stored in the controller 10; these can be used to deposit various layers on a substrate 2.

In each case, a process comprises a multiplicity of steps, wherein the steps can be divided into phases that differ from one another. In a conditioning phase PC, which can, for example, be carried out before the actual coating phase, the process chamber 3, that is to say, the reactor system, is brought up to a setpoint state. The conditioning steps C1.1, C1.2 and C1.3 are carried out with conditioning parameters that differ from one another. During the different conditioning steps C1.1, C1.2, C1.3, for example, the temperatures T within the process chamber 3, or the total pressures P within the process chamber 3, or the gas flows Q (quantity and/or quality) of the conditioning gases, can differ. However, in any process carried out with the CVD-reactor 1, the control parameters SP specified for the control of the temperature, the total pressure, or the gas flows, are fixed and cannot be modified by the user.

In the example embodiment shown in FIG. 2, the conditioning phase has three conditioning steps, each of which must be carried out with invariable control parameters.

In the example embodiment shown in FIG. 3, the conditioning phase PC has, in addition to the first conditioning steps C1.1, C1.2 and C1.3, which must be carried out with fixedly prescribed control parameters, second conditioning steps C2.1, C2.2, which can be carried out with variable control parameters. In the conditioning steps C2.1, C2.2, the user can modify the control parameters.

The conditioning phase PC is followed by a process phase PR, which has various successive process steps R1, R2 and R3, which serve to treat substrates arranged in the process chamber 3, for example to coat the substrates 2 with one or a plurality of layers. The control parameters of the process steps R1, R2 and R3 can be varied by the user.

In accordance with the invention, measured values are collected during all steps of the conditioning phase PC and the process phase PR; these are determined with measuring sensors. The measured data are stored in a memory of the controller 10, or in a storage system.

In accordance with the invention, fingerprints are formed only from the measured values that are obtained during the invariable first conditioning steps C1.1, C1.2, C1.3. For this purpose, the measured values are combined with one another in a suitable manner such that at least one value forming the fingerprint, or a group of values forming the fingerprint, are generated. These values can be evaluated statistically. For example, a minimum value, a maximum value, and a standard deviation, can be formed. In particular, this is done by using measured values from a multiplicity of processes carried out in the past, which were considered to be sound.

In general terms, a fingerprint can be an individual value. Preferably, however, the fingerprint consists of a multiplicity of values, which have been obtained from a multiplicity of measured values. The measured values can, for example, be coolant temperatures, exhaust air temperatures, temperatures of the temperature control bath 14, pump temperatures, gas flow rates or pressures. From these measured values, series of measurements can be formed during a conditioning step. Statistical values can be generated from these measurement series, for example a minimum, maximum, mean, and standard deviation. The statistical values can be part of the fingerprint.

A fingerprint of a current process, determined according to the same rules, can be compared with a historical fingerprint, which has been formed from the evaluation of a multiplicity of historical processes. Here, for example, a check can be made as to whether the current fingerprint, that is to say, the values embodying the fingerprint, lie in a permissible value window.

The measured values used to form the current or the historical fingerprint can take the form of measured values that are determined inside the process chamber 3, for example temperatures that are determined on the walls, ceilings, or other regions of the process chamber 3. However, they can also take the form of measured values that are determined outside the process chamber 3, for example in an exhaust gas flow. Here, the exhaust gas temperature, or gas concentrations in the exhaust gas, can be measured. Furthermore, it can be envisaged that pump temperatures, valve positions, or actual gas flows, are used as measured values to form the fingerprint. The temperature of the coolant flowing through the heating coil 6 can also, for example, be used as a measured value.

Some of the gas sources 7, 8, 9 can be arranged in temperature control baths. The temperatures of these temperature control baths can be used as measured values to form the fingerprint.

The device can have a control cabinet, for example a cabinet in which electrical components are arranged, or in which a gas mixing system, or a loading or unloading device for the CVD-reactor, is arranged. A sensor can be provided to measure a characteristic control cabinet temperature in the latter. This temperature can also be used in the determination of the fingerprint.

The system can include cooling water circuits, with which, for example, a process chamber ceiling, or the reactor housing 1, is cooled. The cooling water temperature can also be used in the formation of the fingerprint.

It is essential that the parameters of the conditioning steps that are used for the historical fingerprint are identical to the parameters of the conditioning steps, from whose measured values the current fingerprint is determined.

With the above-described method, the current fingerprint can be evaluated in accordance with prescribed statistical rules. In particular, a check can be made as to whether information needs to be provided to the user so that the latter can plan maintenance and servicing measures. The comparison of the current fingerprint with the historical fingerprint is thus carried out according to a rule-based decision system. Depending on the rule, only data recorded on the last occasion, or also data from conditioning phases far in the past, are taken into account in the evaluation.

The rules used in the formation of the fingerprints, and also in the comparison of current fingerprints with historical fingerprints can be:

Univariate and multivariate value range and limit value checks:
e.g. mean value x outside the interval [y, z],
standard deviation a>b,
mean value a inside the interval [b, c], and mean value x outside the interval [y, z],
Checking of the change from the previous conditioning process:
e.g. mean value [n]<mean value [n−1]*0.9
Value range check based on a sliding window (with variable window widths) over the previous conditioning processes:
e.g. standard deviation [n] outside the interval (standard deviation [n−1 . . . n−10]−0.5; standard deviation [n−1 . . . n−10]+0.5)
Value range and limit value checks of an extrapolated value on the basis of historical data.

In the case of historical statistical data recorded before and after a maintenance or servicing measure, a difference can be found that can result in a rule violation and a potential false alarm.

To prevent this, a rule can be defined in such a way that, when considering historical data (e.g. a moving average), the only data taken into account is that which was carried out after the point in time of the last maintenance event.

The system executing the rules receives the information as to when a maintenance event has been carried out from a higher-level production control system.

As stated above, the typical production cycle has alternating process phases and conditioning phases. In a first variant of the invention, a multiplicity of values are obtained in conditioning steps of that conditioning phase, which, for example, has been recorded by means of a permanent measurement during the conditioning step. For example, temperatures, flows, or pressures, can be measured over a longer period of time during the at least one first conditioning step. To form a characteristic fingerprint from these measured values, temperature mean values, standard deviations, minima and maxima, are calculated from these measurements. These statistical data then form a fingerprint, so that the fingerprint can have a multiplicity of statistical data from various measured values. By comparing these fingerprints with historical fingerprints, the current state of the coating plant can be characterized. Here it can be envisaged that the historical data only comprises data that has been obtained, for example, from the last ten conditioning phases in the past.

It can be envisaged that the process chamber must be opened for the replacement of replacement parts, or also for other reasons, and in any event for maintenance purposes. When the process chamber is opened in this way, ambient air can enter the process chamber, so that moisture contained in the air can adsorb onto walls of the process chamber. In order to condition the process chamber after a maintenance event, the process chamber is heated to high temperatures under near-vacuum conditions, or during a feed of hydrogen into the process chamber, which is pumped out again by means of a pumping device, wherein such temperatures lie in the range of 700° C. and 800° C. The heating can take place in a plurality of steps. The heating takes place according to process parameters that are prescribed in the controller 10, and, in particular, cannot be modified by the system operator.

Instead of a conditioning phase, however, a calibration phase can also be carried out before the process phase. In particular, however, it is also envisaged that both a calibration phase and a conditioning phase will be carried out before a process phase. In a calibration phase, a plurality of value tuples are determined in one or a plurality of calibration steps, by variation of the susceptor temperature TS and the process chamber ceiling temperature TC, wherein each value tuple has a value of the susceptor temperature TS, a value of the process chamber ceiling temperature TC, and a measured value of the surface temperature TW of the substrate 2.

FIG. 6 shows a schematic cross-section through a CVD-reactor, in which a heating device 6 generates a heat flux H1 into the susceptor 4. A substrate holder 19 is located in a pocket of the susceptor, which holder is supported by a gas cushion, which is generated by a purge gas flow QS. By this means a gap 21 forms between the floor of the pocket of the susceptor 4 and the lower face of the substrate holder 19, through which gap 21 a second heat flux H2 flows. The heat flows through the substrate holder 19 and through the substrate 2 resting on the substrate holder 19. H3 denotes a heat flux, which flows from the surface of the substrate 2 towards the process chamber ceiling 18. The process chamber ceiling 18 is spaced apart from a cooling device 22 by a gap 20. A temperature control gas is located in this gap 20. The temperature control gas is formed by the purge gas QC, which is fed into the gap 20, wherein the purge gas QC is a mixture of gases with mutually differing thermal conductivities, for example $H_2$ and $N_2$. The heat flux H4 through the gap 20 can be influenced by variation of the composition of the purge gas QC.

Above the process chamber ceiling 18 is located the cooling device 22, which is cooled to a setpoint temperature by means of a cooling fluid. The coolant temperature can be measured, and also used in the formation of the fingerprint.

By balancing the heat conduction properties of all components of the heat fluxes H1, H2, H3, H4, the temperature of the surface of the substrate 2, namely the substrate temperature TW, and the temperature of the process chamber ceiling, namely the process chamber ceiling temperature TC, can be influenced.

Reference number 23 denotes a first temperature regulator, which regulates the susceptor temperature TS measured on the lower face of the susceptor 4 against a setpoint value $T_{So}$. This is done by influencing the heating power LS fed into the heating device 6. The susceptor temperature TS, or the heating power LS, forms a heat input parameter, with which a heat flux H1, H2 from the heating device 6 to the substrate 2 is influenced.

Reference number 24 denotes a second control loop, with which the process chamber ceiling temperature TC is regulated against a setpoint value $T_{Co}$. This can be done by influencing the coolant temperature of the cooling device 22. However, this can also be done by variation of the mixing ratio of the temperature control gas QC that is fed into the gap 20. The temperature control gas consists of a mixture of a gas having a high thermal conductivity, for example $H_2$, and a gas having a low thermal conductivity, for example $N_2$. The process chamber ceiling temperature TC, or the mixing ratio of the temperature control gas QC, or the cooling performance of the cooling device 22, form a heat dissipation parameter.

FIG. 7 is a temperature/time diagram. FIG. 7 shows four first calibration or conditioning steps C1.1, C1.2, C1.3 and C1.4, successively carried out. During these calibration or conditioning steps C1.1, C1.2, C1.3 and C1.4, the susceptor temperature TS, which is measured on the lower face of the susceptor 4, is increased in a stepwise manner from about 750° C. to about 1200° C. The substrate temperature TW and the process chamber ceiling temperature TC are measured in parallel.

It can be seen that the measured values N1, N2, N3, N4, N5, N6, N7, N8, N9, N10, N11, N12, N13, N14, N15, N16 of the substrate temperature TW are lower than the susceptor temperature TS, which is used to regulate the process temperature.

The lower curve in FIG. 7 shows the profile of the process chamber ceiling temperature TC, wherein the mixing ratio of the purge gas QC fed into the gap 20 is varied successively in time in each of the four calibration or conditioning steps. The measurement M1 is a temperature measurement of the process chamber ceiling temperature, in which the $H_2$ content in the $H_2/N_2$ mixture of the purge gas QC is 95 percent. The measurement M2 was obtained at a mixing ratio of 35 percent, the measurement M3 at a mixing ratio of 65 percent, and the measurement M4 at a mixing ratio of 5 percent $H_2$. A total of 16 temperature values TC were obtained, and 16 temperature values TW were obtained during the four calibration or conditioning steps. In each of the calibration or conditioning steps, the four above-designated purge gas compositions were sequentially injected into the gap 20 of the process chamber ceiling 18. Each of the measurements M1 to M16, and N1 to N16, was taken over a period of a number of seconds, for example 20 seconds. During the measurement, mean values and other statistical data were obtained. The measured values N1 to N16, M1 to M16, and any additionally calculated statistical data, represent a thermal fingerprint of the CVD-reactor.

Figure 8:
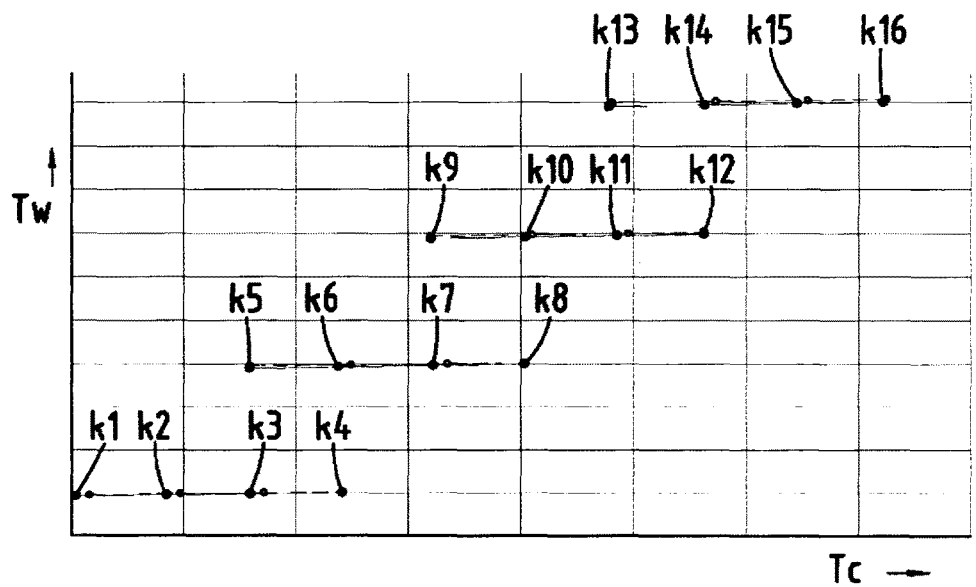
FIG. 8 shows a first example of how tuples K1 to K16 of a fingerprint are derived from the measured values M1 to M16 and N1 to N16, obtained during the conditioning process as in FIG. 7.

In addition, the timewise gradients, that is to say the first derivatives with respect to time, can also be calculated from the individual measurements obtained during the measurement sequence in question; these are statistically evaluated in the above-described manner. Statistical data can also be calculated from the said derived values; these are included in the thermal fingerprint. The thermal fingerprint thus obtained can be compared with one or a plurality of historical fingerprints, or an averaged historical fingerprint. FIG. 8 shows tuples of measured values K1, K2, K3, K4, up to K16, representing the measurements (M1,N1), (M2,N2) . . . (M16,N16). The process chamber ceiling temperature TC of the respective measurement M1, M2 . . . is shown on the X-axis. The measured substrate temperature TW is plotted on the Y-axis. It is thus the measured values N1, N2 . . . that here determine the vertical positions of the points K1, K2 . . . . The solid line is a regression curve, and can be compared with a dotted line that represents the historical fingerprint.

Figure 9:
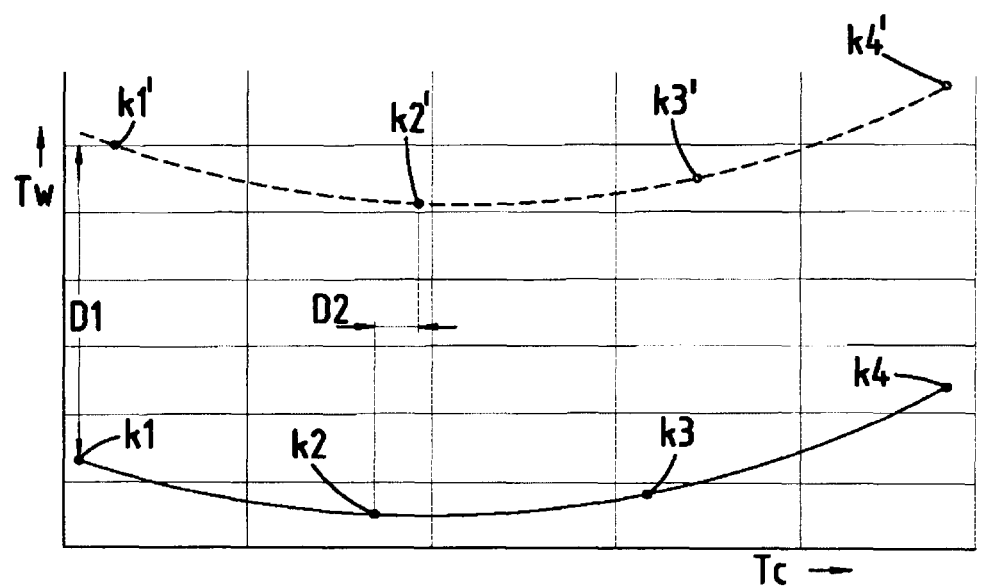
FIG. 9 shows schematically how tuples K1 to K4 of a fingerprint are compared with tuples K1' to K4' of a historical fingerprint.

FIG. 9 shows a similar presentation to FIG. 8, but here, instead of a linear regression curve, a quadratic regression curve is drawn through the points K1, K2, K3 and K4. The points K1, K2, K3, K4 on the curve can be compared with the historical measurement points K1', K2', K3', K4', wherein a separation distance $D_1$ is determined for the substrate temperature TW, and a separation distance $D_2$ is determined for the process chamber ceiling temperature TC. These separation distances $D_1$, $D_2$ can be compared with maximum values. If the separation distances $D_1$, $D_2$ exceed the specified maximum values, this is an indication that something has been altered in the state of the CVD-reactor. However, if the separation distances $D_1$, $D_2$ are within prescribed value windows, this is interpreted to mean that the CVD-reactor is located in a setpoint state.

The method shown in FIG. 7 is also used to determine the thermal characteristics of a CVD-reactor 1, and in particular to calibrate a characteristic curve. In a calibration phase, which is carried out before a process phase, in which a substrate 2 is thermally treated, in particular coated, in one or a plurality of process steps, parameters are determined, with which a prescribed substrate temperature TW can be set. The steps represented in FIG. 7 by C1.1, C1.2, C1.3 and C1.4 form calibration steps, in which the mixing ratios of the temperature control gas QC are modified at a respectively fixed value of a susceptor temperature TS. The mixing ratio and a cooling performance of the cooling device 22 form further parameters. This is repeated for a multiplicity of different susceptor temperatures TS. In each case, the measured values determined in this manner form tuples, which include the following elements: the set, and in particular regulated, susceptor temperature TS, the mixing ratio of the temperature control gas, or the regulated temperature TC of the process chamber ceiling and, as required, in addition the cooling performance of the cooling device 22 as well as, further heat input parameters or heat dissipation parameters, as required, influencing the heat flux into the substrate 2 and the heat dissipation from the substrate.

Figure 10:
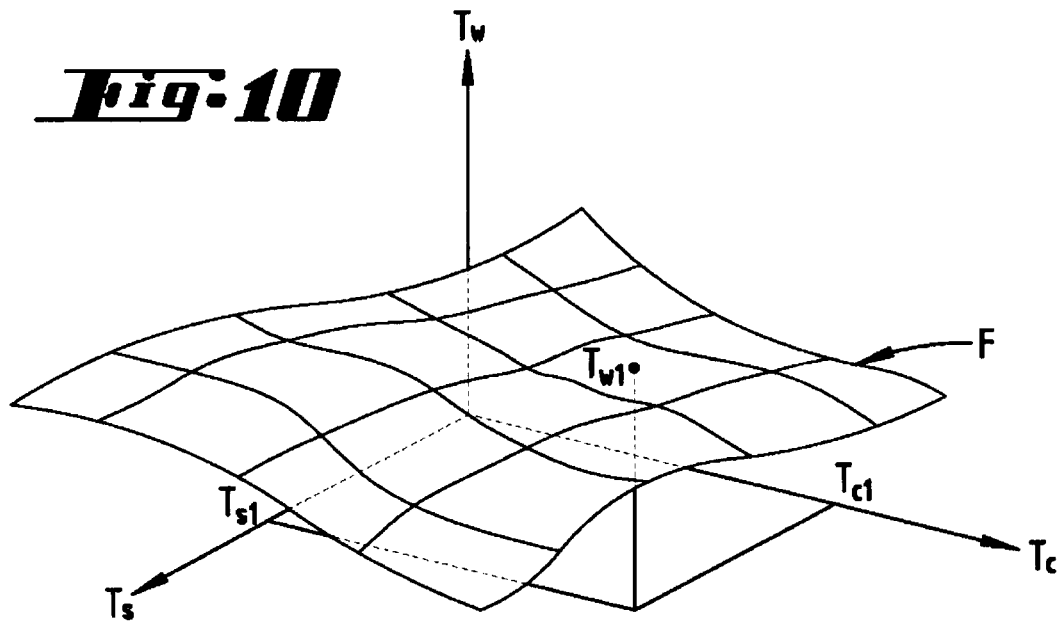
FIG. 10 shows an illustration of a two-dimensional function in terms of the susceptor temperature TS and the process chamber ceiling temperature TC, calculated from a multiplicity of value tuples by means of interpolation, wherein the function F represents the surface temperatures TW of the substrate.

For simplicity, FIG. 10 shows the influence of only two parameters, namely the susceptor temperature TS, and the process chamber ceiling temperature TC, on the substrate temperature TW. The substrate temperature TW is there shown as a two-dimensional function F over the two arguments TC and TS. The function F is calculated by means of a surface (two-dimensional) interpolation over the grid points formed by the measured value tuples. From the "hilly surface" obtained in this way, the point can be determined that corresponds to the value TW1 that comes closest to a prescribed substrate temperature, that is to say, corresponds to a prescribed substrate temperature. The said value TW1 corresponds to a value TC1 of a process chamber ceiling temperature TC, and to a value TS1 of a susceptor temperature TS.

In a process step of a process phase carried out after the calibration phase, in which the substrate temperature TW is to reach the said value TW1, the susceptor 4 is regulated to the susceptor temperature TS1, and the process chamber ceiling 18 is regulated to the said temperature TC1.

Figure 11:
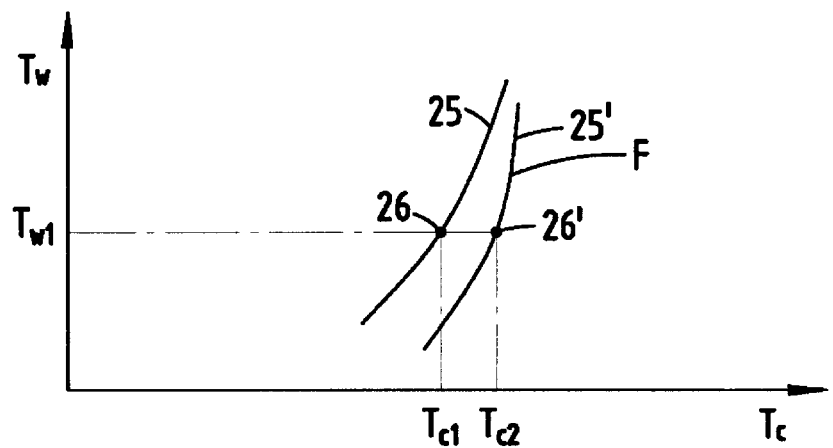
FIG. 11 shows an illustration of a standard calibration curve 25, and a calibration curve 25' determined in the calibration phase in a coordinate system, which on the X-axis specifies the process chamber ceiling temperature TC, and on a Y-axis specifies the surface temperature TW of the substrate.

FIG. 11 shows a standard characteristic curve 25, as it is prescribed by a formula. The point 26 is the point at which, under standard conditions, a process chamber ceiling temperature TC1, at a prescribed susceptor temperature TS, leads to a substrate temperature TW1. The standard characteristic curve 25 is one curve of a set of curves, wherein each curve of the set of curves corresponds to a different susceptor temperature TS.

The reference number 25' denotes a corrected characteristic curve. This corrected characteristic curve 25' has been determined by means of the above-described calibration method. The corrected characteristic curve 25' is also one curve of a set of curves. The set of curves has a multiplicity of curves, which in each case have been recorded at one of the different susceptor temperatures TS, that is to say, in each case in a calibration step C1.1, C1.2, C1.3 or C1.4. From the measured values recorded in the individual calibration steps C1.1, C1.2, C1.3 and C1.4, the curve of the function F, which represents the corrected characteristic curve 25', has been determined by means of an interpolation. The inverse function can be formed from this function F, so that the current process chamber ceiling temperature TC2 can be directly determined for a prescribed substrate temperature TW1 from the point 26' on function F.

It is considered advantageous, amongst other items, that value tuples are determined during the calibration phase by the selective variation of parameters that influence the heat flux into the substrate and the heat dissipation from the substrate. The parameters are, for example, the susceptor temperature TS, and/or the process chamber ceiling temperature TC. The value tuples contain the respectively measured substrate temperature as a further element. By means of interpolation, a multi-dimensional function, or a set of one-dimensional functions, is determined from these value tuples. By means of an interval nesting, a Taylor expansion, or other suitable mathematical, in particular numerical, methods, on the basis of these functions, or sets of functions, the parameter set is determined that corresponds to a substrate temperature TW that comes closest to, or corresponds to, a substrate temperature desired in a process step.

It is considered particularly advantageous if the calibration steps, carried out to determine the calibration function F, are part of a conditioning phase.

The above statements serve to explain the inventions covered by the application as a whole, which inventions also autonomously advance the prior art at least by means of the following combinations of features in each case, wherein two, a plurality, or all, of these combinations of features can also be combined, namely:

A method, which is characterized in that the fingerprint also comprises, or only comprises, such values, or groups of values, which are obtained from measured values, which are recorded during one or a plurality of calibration or conditioning steps C1.1, C1.2, C1.3 of a calibration or conditioning phase PC, PC', in which in each case at least a calibration or conditioning temperature T and a calibration or conditioning pressure P are set, and a calibration or conditioning gas flow Q is fed into the process chamber 3, in accordance with control data supplied by the formula.

A device, which is characterized in that the fingerprint also comprises, or only comprises, such values, or groups of values, which are obtained from measured values, which are recorded during one or a plurality of calibration or conditioning steps C1.1, C1.2, C1.3 of a calibration or conditioning phase PC, PC', in which in each case at least a calibration or conditioning temperature T and a calibration or conditioning pressure P are set, and a calibration or conditioning gas flow Q is fed into the process chamber 3, in accordance with control data supplied by the formula.

A method or a device, which is characterized in that the calibration or conditioning steps have first calibration or conditioning steps C1.1, C1.2, C1.3, and second calibration or conditioning steps C2.1, C2.2, wherein the fingerprint comprises, only such values, or a group of values, which are obtained from measured values recorded during the first calibration or conditioning steps C1.1, C1.2, C1.3, wherein the control data of the first calibration or conditioning steps C1.1, C1.2, C1.3 are stored in an invariable manner in the controller 10.

A method or a device, which is characterized in that the measured values are values of physical quantities, which are measured inside the process chamber 3, or outside the process chamber 3, and in particular are cooling water temperatures, temperature control bath temperatures of temperature control baths 14, flow rates, temperatures of pumps, gas lines or fluid lines, temperatures or gas concentration values measured in an exhaust gas flow, or control cabinet exhaust air 17, or the like.

A method or a device, which is characterized in that at least one of the one or plurality of first calibration or conditioning steps C1, C2, C3, C4 is a cleaning step, in which a cleaning gas, which contains, in particular, a halogen, for example chlorine, or a hydride, for example ammonia, is fed into the process chamber 3.

A method or a device, which is characterized in that the fingerprint, in particular the historical fingerprint, is obtained by a statistical evaluation of measured data, in particular for older processes, wherein statistical mean values, minimum values, maximum values, and/or standard deviations, are determined.

A method or a device, which is characterized in that at least one of the one or plurality of first conditioning steps C1.1, C1.2, C1.3 is a temperature control step, in which a temperature control gas, for example hydrogen, is fed into the process chamber at an elevated temperature, in particular in a range between 700 and 1200° C.

A method or a device, which is characterized in that a conditioning phase PC is carried out before or after each process phase PR, during which a fingerprint is obtained.

A method or a device, which is characterized in that a conditioning step PC, with one or a plurality of first conditioning steps C1.1, C1.2, C1.3, is carried out after a preceding maintenance event W, and/or in that a calibration or conditioning step PC, with one or a plurality of first calibration or conditioning steps C1.1, C1.2, C1.3, is carried out after a preceding maintenance event W, during which ambient air has entered the process chamber 3, wherein the fingerprint obtained from the one or a plurality of measured values is a "thermal fingerprint".

A method or a device, which is characterized in that the comparison of the current fingerprint with the historical fingerprint is carried out in accordance with a rule-based decision system.

A method or a device, which is characterized in that at least one value of the fingerprint is calculated from a series of measurements obtained successively over time, wherein in particular it is envisaged that a derivative with respect to time is formed from the measured values.

A method, which is characterized in that in a calibration phase, which in time precedes the process phase, in a plurality of calibration steps C1.1, C1.2, C1.3 a multiplicity of value tuples is determined, in each case having a value of the first parameter TS, LS, a value of the second parameter TS, QC, and an actual temperature TW of the substrate surface occurring at these values, wherein from the multiplicity of value tuples a function F representing the actual temperature TW by way of at least one of the parameters is formed by means of an interpolation, from which function a value TW1 of the at least one parameter TC, QC; TS, LS is obtained, which is correlated with an actual temperature TW of the substrate surface that comes closest to a prescribed substrate temperature.

A method, which is characterized in that the heat input parameter is a susceptor setpoint temperature $T_{So}$, against which a first control loop 23 regulates a susceptor actual temperature Ts by variation of a heating power LS supplied to a heating device 6, or the heating power LS, and/or that the heat dissipation parameter is the setpoint temperature of a cooling device 22, the mixing ratio of a temperature control gas consisting of two gases with different thermal conductivity properties, which is fed into a gap 20 between a cooling device 22 and a process chamber ceiling 18, or a process chamber ceiling setpoint temperature $T_{So}$, against which a second control loop 24 regulates a process chamber ceiling actual temperature Tc.

A method, which is characterized in that, in order to carry out the interpolation, a one-dimensional or multi-dimensional function is formed, whose grid points form the value tuples.

A method, which is characterized in that a plurality of first calibration or conditioning steps directly follow one another, wherein in particular it is envisaged that the plurality of calibration or conditioning steps are carried out at stepwise temperatures increasing or decreasing in a stepwise manner, and/or with changing cooling parameters.

A method, which is characterized in that the measured values comprise a substrate temperature TW and a process chamber ceiling temperature TC, wherein in the calibration or conditioning phase PC, temperatures TS and thermal conductivities are successively modified in a heat flux H1, H2, H3, H4 from a heating device 6 to a cooling device 22.

All disclosed features are essential to the invention (individually, but also in combination with each other). The disclosure of the application hereby also includes the full disclosure content of the associated/attached priority documents (copy of the previous application), also for the purpose of including features of these documents in the claims of the present application. The subsidiary claims, even without the features of a claim referred to, characterise with their features independent inventive developments of the prior art, in particular in order to make divisional applications on the basis of these claims. The invention specified in each claim can additionally have one or a plurality of the features specified in the above description, in particular those provided with reference numerals, and/or in the list of reference numerals. The invention also relates to forms of design, in which individual features cited in the above description are not realized, in particular to the extent that they can recognisably be dispensed with for the respective intended use, or can be replaced by other means having the same technical effect.

LIST OF REFERENCE SYMBOLS

1 CVD-reactor
2 Substrate
3 Process chamber
4 Susceptor
5 Gas inlet
6 Heating device
7 Gas source
8 Gas source
9 Gas source
10 Controller
11 Throttle valve
12 Vacuum pump
13 Fluid source
14 Temperature control bath
15 Cabinet
16 Incoming air
17 Exhaust air
18 Process chamber ceiling
19 Substrate holder
20 Gap
21 Gap
22 Cooling device
23 First control loop
24 Second control loop
25 Standard characteristic curve
25' Corrected characteristic curve
26 Point
26' Point
$D_1$ Separation distance
$D_2$ Separation distance
t Time
C1.1 First calibration/conditioning step
C1.2 First calibration/conditioning step
C1.3 First calibration/conditioning step
C2.1 Second calibration/conditioning step
C2.2 Second calibration/conditioning step
F Function
H1 Heat flux
H2 Heat flux
H3 Heat flux
H4 Heat flux
K1 . . . K16 Measured tuple or point
K1' . . . K16' Historical measured tuple or point
LS Heating power
M1 . . . M16 Measured value
N1 . . . N16 Measured value
p Pressure
PC Conditioning phase
PC' Conditioning phase
PR Process phase
Q Process gas flow
QC Purge gas
QS Purge gas
R1 Process step
R2 Process step
R3 Process step
TS Susceptor temperature
TC Ceiling temperature
TW Substrate temperature

What is claimed is:

1. A method for operating a chemical vapor deposition (CVD) reactor (1) having a process chamber (3) and a cooling device (22), the process chamber (3) including a process chamber ceiling (18) that is separated from the cooling device (22) by a gap (20), the method comprising:

during each of one or more process steps (R1, R2, R3) of a process phase (PR), in which a substrate (2) is located in the process chamber (3), and in accordance with first control data that is varied by a user and stored in a controller (10), setting by the controller (10) at least one process temperature (T) and one process pressure (P), and feeding a process gas flow (Q) into the process chamber (3);

before or after the process phase (PR), and during at least one of one or more conditioning steps (C1.1, C1.2, C1.3) of a conditioning phase (PC, PC'), setting by the controller (10) at least one conditioning temperature (T) and one conditioning pressure (P), and controlling by the controller (10) a flow of conditioning gas flow (Q) into the process chamber (3) in accordance with second control data that is stored in an invariable manner in the controller (10), the second control data specifying, for the at least one conditioning step (C1.1, C1.2, C1.3), a percent of hydrogen in a hydrogen/nitrogen mixture of purge gas fed into the gap (20) between the cooling device (22) and the process chamber ceiling (18), wherein no substrates (2) are located in the process chamber (3) during the conditioning phase (PC, PC');

determining a current fingerprint only from data measured by a plurality of sensors during the at least one conditioning step (C1.1, C1.2, C1.3);

comparing the current fingerprint with a historical fingerprint derived only from data measured from a previous conditioning step, the previous conditioning step carried out at the at least one conditioning temperature (T), one conditioning pressure (P) and in accordance with the second control data that is stored in the invariable manner in the controller (10); and based on results of the comparison of the current fingerprint with the historical fingerprint, determining deviations of a current state of the CVD reactor from a setpoint state, and providing information to the user for the user to plan maintenance and servicing measures for the CVD reactor.

2. The method of claim 1, wherein the conditioning phase (PC, PC') has first conditioning steps (C1.1, C1.2, C1.3) and second conditioning steps (C2.1, C2.2), wherein the current fingerprint is determined from data measured by the plurality of sensors during the first conditioning steps (C1.1, C1.2, C1.3), and wherein third control data of the first conditioning steps (C1.1, C1.2, C1.3) are stored in the invariable manner in the controller (10).

3. The method of claim 1, wherein the current fingerprint comprises one or more of cooling water temperatures, temperatures of temperature control baths (14), flow rates, temperatures of pumps, gas lines or fluid lines, temperatures measured in an exhaust gas flow or control cabinet exhaust air (17), or gas concentration values.

4. The method of claim 1, wherein one or more of the current fingerprint or the historical fingerprint are obtained by a statistical evaluation of measured data, and wherein the statistical evaluation comprises computing one or more of statistical mean values, minimum values, maximum values, and standard deviations.

5. The method of claim 1, wherein the at least one or more conditioning step (C1.1, C1.2, C1.3) comprises a temperature control step, in which a temperature control gas, or hydrogen, is fed into the process chamber (3) at a temperature in a range between 70° and 1200° C.

6. The method of claim 1, further comprising performing a maintenance event (W) prior to the conditioning phase (PC, PC'), during which ambient air is introduced into the process chamber (3), wherein the current fingerprint comprises a thermal fingerprint.

7. The method of claim 1, wherein the comparison of the current fingerprint with the historical fingerprint is carried out in accordance with a rule-based decision system.

8. The method of claim 1, wherein at least one value of the current fingerprint is calculated from at least one of:
(i) a series of measurements obtained successively over time, and
(ii) a derivative with respect to time formed from the data measured by the sensors.

9. The method of claim 1, wherein the conditioning phase (PC, PC') comprises one or more of:
a plurality of conditioning steps that are performed one after another; and
a plurality of conditioning steps that are sequentially carried out at temperatures increasing or decreasing in a stepwise manner, and/or with changing cooling parameters.

10. The method of claim 1, wherein the measured data comprise a process chamber ceiling temperature (TC), and wherein during the conditioning phase (PC, PC'), a temperature of a susceptor (TS) and thermal conductivities of gap regions are successively modified so as to control a heat flux (H1, H2, H3, H4) from a heating device (6) to the cooling device (22).

11. The method of claim 1, wherein the at least one conditioning step (C1.1, C1.2, C1.3) is performed with process parameters that are held constant throughout the at least one conditioning step (C1.1, C1.2, C1.3).

12. The method of claim 1, wherein the at least one conditioning step (C1.1, C1.2, C1.3) comprises a cleaning step, in which a cleaning gas is fed into the process chamber (3).

* * * * *